Patented June 23, 1925.

1,543,384

UNITED STATES PATENT OFFICE.

OLIVER HERZOG, OF BERLIN-DAHLEM, GERMANY.

PROCESS OF DISSOLVING SUBSTANCES WITH THE AID OF EMULSIONS OF WOOL FAT.

No Drawing.   Application filed January 29, 1925. Serial No. 5,665.

*To all whom it may concern:*

Be it known that I, OLIVER HERZOG, a citizen of the German Realm, residing at Berlin-Dahlem, Germany, have invented certain new and useful Improvements in Processes of Dissolving Substances with the Aid of Emulsions of Wool Fat; and I do hereby declare the following to be a full, clear, and exact description of the invention, such as will enable others skilled in the art to which it appertains to make and use the same.

It is known that wool fat is readily emulsifiable with water. As the result of experimental research it has been ascertained that the emulsifiability is increased when, in lieu of wool fat, there are employed separately the liquid and solid fractions of the wool fat or the sulphonation products thereof.

The oily and waxy fractions are obtained from a solution of wool fat in acetone saturated at 40° C.,—said solution being obtained by extraction from raw wool or by treatment of suitable wool fat of commerce with acetone—by allowing such solution to stand for several hours at 0° C., the waxy fraction separating out while the oily fraction remains in solution. The two fractions are separated in the usual manner i. e., by filtration and freed from acetone. By preliminary treatment of the solution of wool fat in acetone or by treatment of the wool fat itself to remove insoluble impurities, there can be obtained light yellow or almost white fats.

To obtain the sulphonation products, the oily fraction or the waxy fraction after first being melted is treated with concentrated sulphuric acid at low temperature, washed with distilled water to remove the acid which has not entered into combination, and neutralized with soda lye or soda solution. By adding the sulphuric acid slowly, and thoroughly stirring the mixture, the temperature of the mixture due to the exothermic reaction can easily be kept sufficiently low. Artificial cooling, as by an ice bath, may be resorted to, in the manner well known to chemists, to maintain the temperature below that at which the sulphuric acid acts in an oxidizing manner.

The oily fraction consists of the esters of the low melting fatty acids or wool fat acids (valeric, caproic ($C_6H_{12}O_2$) myristic ($C_{14}H_{28}O_2$), oleic, carnauba ($C_{24}H_{28}O_2$) acid, etc.); the waxy fraction consists mainly of cholesterin, isocholesterin,— and oxycholesterin alcohols and esters of the melting fatty acids.

The oily fraction is of a colour between yellow and reddish brown, the solid fraction is of a shade between yellow and white and of wax-like consistency. In chemical and physical constants the two fractions differ considerably from one another.

|  | Oily fraction. | Waxy fraction. |
|---|---|---|
| Melting point | 14–20° C. | 50–65° C. |
| Iodine No. | 24 | 7–12 |
| Saponification No. | 120 | 95 |

The oily and solid sulphonation products form yellow and white emulsions respectively, with water. They mix in all proportions with distilled or condensed water and can take up large quantities of substances insoluble in water, for example, ether, benzine, benzol, chloroform, carbon tetrachloride, etc.

Aqueous emulsions of the oily or liquid fraction of wool fat are readily formed by stirring and thoroughly mixing the liquid portion by a jet of steam or by an oxygen free gas, such as nitrogen, hydrogen and the like.

Emulsions of the hard or wax-like fraction of wool fat are readily made by mixing such hard fraction with water of a temperature of 60°–70° C., in like manner.

Liquids insoluble or soluble with difficulty in water may be added to such emulsions and the wool fat fractions act as emulsifiers for such additions and disperse them completely and uniformly.

The efficiency of either wool fat fraction as an emulsifying agent is still further increased if the fatty acids usually present in such fractions are neutralized by alkalies, or by hydrolytically decomposable alkali salts of weak acids, the same being added until the emulsion mixture is weakly alkaline.

Finally, protective colloids may be added to the emulsions, such as albuminous substances, of which glue and gelatine are types, or such as carbohydrates, of which tragacanth and starch are types.

*Example I.*

Two kilos of the soft or oily fraction of wool fat is dispersed in 8 kilos of water by a steam jet, until the mixture is uniform, the heat of the steam increases the speed of formation of the mixture during the stirring action of the jet. After cooling, about 5 kilos of benzol or other organic water-insoluble liquid is added, and after shaking for a short time is uniformly distributed in the aqueous phase, the dispersed wool fat acting as the emulsifying agent.

*Example II.*

One kilo of the soft or oily fraction of wool fat is neutralized with caustic soda and dispersed in 9 kilos water by means of a steam jet and simultaneously conducting through the mixture nitrogen. Then one-half kilo of camphor is added together with 2–5% of ethyl-alcohol to facilitate the dispersion.

*Example III.*

Three kilos of the oily fraction of wool fat and two-tenths of a kilo of sodium caseinate are dispersed in 7 kilos of water by shaking. Such an emulsion will take up five times its quantity of olive oil or castor oil or cod liver oil and form a stable emulsion.

*Example IV.*

One kilo of the hard or waxy fraction of wool fat is melted, neutralized with sodium carbonate and stirred into one kilo of water heated to 65° C. After cooling, two kilos of carbon-tetrachloride or chloroform is shaken with it to a stable, uniform emulsion.

As emulsifiers the solid and oily fractions of wool fat and their sulphonated compounds may be used, either separately or mixed together.

I claim—

1. The method of making aqueous emulsions of water-insoluble liquids, which comprises forming an aqueous emulsion with either the waxy or the oily fraction of wool fat as an emulsifying agent for said liquids.

2. The method of making aqueous emulsions of water-insoluble liquids, which comprises forming an aqueous emulsion with either the waxy or the oily fractions of wool fat as an emulsifying agent for said liquids and a protective colloid.

3. The method of making aqueous emulsions of water-insoluble liquids, which comprises forming an aqueous emulsion with either the waxy or the oily fraction of wool fat as an emulsifying agent for said liquids and stabilized by imparting thereto a weak alkaline reaction.

4. The method of making aqueous emulsions of liquids insoluble in or but slightly soluble in water, which comprises emulsifying such a mixture with either the waxy or the oily wool fat fraction and its sulphonated product.

5. The method of making aqueous emulsions of liquids insoluble in or but slightly soluble in water, which comprises emulsifying such a mixture with either the waxy or the oily fraction of a wool fat and its sulphonated product and a protective colloid.

6. The method of making aqueous emulsions of liquids insoluble in or but slightly soluble in water, which comprises emulsifying such a mixture with either the waxy or the oily wool fat fraction and its sulphonated product both rendered weakly alkaline.

7. The method of making aqueous emulsions of liquids insoluble in or but slightly soluble in water, which comprises emulsifying such a mixture with either the waxy or the oily wool fat fraction and its sulphonated product both rendered weakly alkaline, and adding thereto a protective colloid.

In testimony that I claim the foregoing as my invention, I have signed my name.

OLIVER HERZOG.